T. E. MURRAY.
METAL VEHICLE WHEEL.
APPLICATION FILED MAR. 2, 1916.
1,186,224.
Patented June 6, 1916.
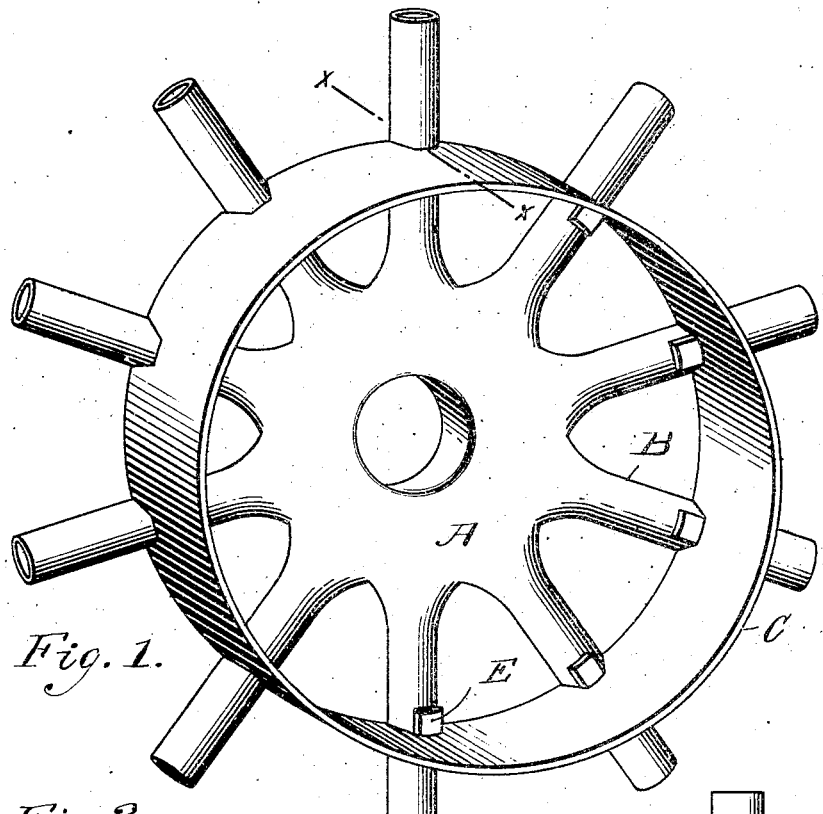
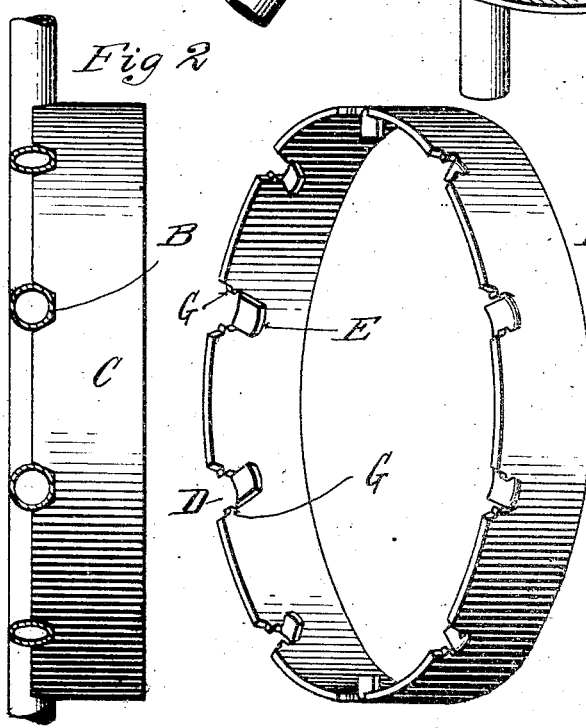
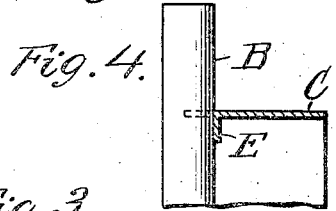
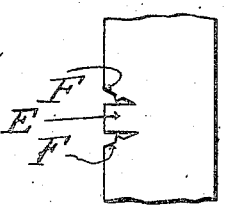
Inventor
Thomas E. Murray
by his attorney

UNITED STATES PATENT OFFICE.

THOMAS E. MURRAY, OF NEW YORK, N. Y.

METAL VEHICLE-WHEEL.

1,186,224.  Specification of Letters Patent.  Patented June 6, 1916.

Application filed March 2, 1916. Serial No. 81,588.

*To all whom it may concern:*

Be it known that I, THOMAS E. MURRAY, a citizen of the United States, residing at New York, in the county of New York and State of New York, have invented a certain new and useful Improvement in Metal Vehicle-Wheels, of which the following is a specification.

The invention relates to metal vehicle wheels, and consists in the brake pulley formed of a simple metal band, having notches receiving the tubular spokes of the wheel, and welded to said spokes.

The object is to simplify and cheapen the construction.

In the accompanying drawings—Figure 1 is a perspective view of the brake pulley in place on the wheel spokes. Fig. 2 is a side elevation of the same. Fig. 3 shows the brake pulley separately and in perspective. Fig. 4 is a section on the line $x$, $x$ of Fig. 1. Fig. 5 shows the spoke-receiving notch in the edge of the brake pulley before the projection in said notch has been bent over.

Similar letters of reference indicate like parts.

A is the wheel body, to the spokes B of which the brake pulley C is attached. Said pulley is a ring or band of metal having on one edge as many notches D as there are spokes in the wheel to which it is applied. In each notch is left a middle projection E having straight edges. The edges F of the notch are inclined toward the base of said projection, and on each edge is formed a V-shaped lug G. The projection E is bent over inwardly at right angles and may be concave on its outer surface. The spokes B are placed in the notches D of pulley C, and are electrically welded to the edges F of said notches and to the projections E. The lugs G are fused during the welding operation and supply metal for uniting the spokes and edges F.

I claim:

1. A brake pulley for metal vehicle wheels, consisting of a circular band having in one edge notches for receiving the wheel spokes, each notch having at its bottom a projection formed of the metal of the band bent over radially inward.

2. In combination with the spokes of a metal vehicle wheel, a brake pulley consisting of a circular band having in one edge a plurality of notches, each receiving a wheel spoke and each having at its bottom a projection formed of the metal of the band bent radially inward and welded to the spoke, and the said spokes being also welded to the edges of said notches.

In testimony whereof I have affixed my signature in presence of two witnesses.

THOMAS E. MURRAY.

Witnesses:
　GERTRUDE T. PORTER,
　MAY T. McGARRY.